United States Patent
Magdaleno, II et al.

[11] Patent Number: 5,986,581
[45] Date of Patent: Nov. 16, 1999

[54] PROGRAMMABLE INFRARED MARKER (PIRM)

[75] Inventors: Rudolph H. Magdaleno, II; John Kelly, both of Albuquerque; Douglas Webb, Edgewood, all of N.Mex.

[73] Assignee: The United States of America as represented by the Secretary of the Air Force, Washington, D.C.

[21] Appl. No.: 09/006,524

[22] Filed: Jan. 13, 1998

[51] Int. Cl.⁶ ........................................................ B64F 1/18
[52] U.S. Cl. .......................... 340/953; 340/947; 362/252
[58] Field of Search .................................... 340/947, 949, 340/950, 952, 953, 954, 956, 958; 362/252, 800, 240, 227; 244/114 R

[56] References Cited

U.S. PATENT DOCUMENTS

| | | | |
|---|---|---|---|
| 3,925,704 | 12/1975 | Camic | 340/953 |
| 4,093,937 | 6/1978 | Habinger | 340/949 |
| 4,554,544 | 11/1985 | Task | 340/953 |
| 4,590,471 | 5/1986 | Pieroway et al. | 340/947 |
| 4,761,720 | 8/1988 | Solow | 362/252 |
| 4,768,136 | 8/1988 | Tashjiah | 362/84 |
| 5,381,318 | 1/1995 | Fang | 362/103 |
| 5,559,510 | 9/1996 | Strong, III et al. | 340/953 |
| 5,769,533 | 6/1998 | Yamuro et al. | 362/252 |
| 5,848,837 | 12/1998 | Gustafson | 362/240 |

*Primary Examiner*—Brent A. Swarthout
*Attorney, Agent, or Firm*—William G. Auton

[57] ABSTRACT

An electrical strip of infrared radiating elements which is powered by a battery and rolled up on a wheel and has many advantages over the present device. The first is visibility. It is highly visible at over three miles and the system is a ¾" strip with LEDs placed every meter and on both sides that is rolled up on a reel. To deploy the marker the strip can be staked or held at one end while the strip is simply unrolled of the reel. The PIRM is self packing and, if packaged to do so, can automatically roll itself up. The PIRM can be operated either by a switch on the reel or remotely, by laser remote control or by a switch on the reel. The flashing pattern is completely programmable. The pattern can be used as a wind direction indicator. The speed it flashes can be used to indicate how hard the wind is blowing or how dangerous the landing zone is.

2 Claims, 7 Drawing Sheets

5,986,581

PROGRAMMABLE INFRARED MARKER (PIRM)

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to lighting beacons, and more specifically the invention pertains to a programmable infrared marker of infrared light emitting diodes (IR LEDs).

The Air Force has requirements for a rapidly deployable, portable and remotely operable, austere aircraft landing zone marker light system. Such a system is needed to aid pilots in making successful night landings at unimproved austere landing sites for rapid deployment of troops or equipment. The ideal landing zone light system would use little power, be lightweight and portable, have sufficient visible range to be seen from several miles away, and be capable of reliable operation from a remote location.

The task of providing a portable landing zone marker system is alleviated, to some extent, by the following U.S. patents, the disclosures of which are incorporated herein by reference:

U.S. Pat. No. 4,768,136 issued to Tashian; and

U.S. Pat. No. 4,590,471 issued to Pieroway et al.

Both of the above-cited patents disclose aircraft landing zone marker systems. However, they both are restricted to emitting visible light (this can be obscured by fog and clouds) using chemical and electroluminescent means of illumination. A need remains to provide an infrared aircraft landing marker system that penetrates clouds. The present invention is intended to satisfy that need.

SUMMARY OF THE INVENTION

The present invention includes a programmable infrared marker that uses a ¾ inch electrical strip of infrared light emitting diodes distributed with diodes approximately one meter apart on both sides.

The electrical strip, diodes, and electrical power source are commercially-available elements of the invention. The present invention can use elements of existing technology, such as the above-cited Pieroway et al patent, to provide an improved aircraft landing zone marker that is not impaired by fog or clouds.

As mentioned above, the system is a ¾" strip with LEDs placed every meter and on both sides that is rolled up on a reel. To deploy the marker the strip can be staked or held at one end while the strip is simply unrolled of the reel. The PIRM is self packing and, if packaged to do so, can automatically roll itself up. The PIRM can be operated either by a switch on the reel or remotely, by laser remote control or by a switch on the reel. The flashing pattern is completely programmable. The pattern can be used as a wind direction indicator. The speed it flashes can be used to indicate how hard the wind is blowing or how dangerous the landing zone is.

It is an object of the present invention to provide an improved aircraft landing zone marker system that is portable, and which uses infrared illumination.

It is another object of the invention to provide a programmable landing zone marker system.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an infrared beacon system that was designed as a portable, and quickly deployable landing zone marker for Special Operations personnel. It can be seen from a distance of at least three miles away. It incorporates a strobes mode that can be used to indicate wind direction or be encoded to convey other information about the landing zone. It can also be used similarly as an equipment and supply drop zone marker.

Figure 1:
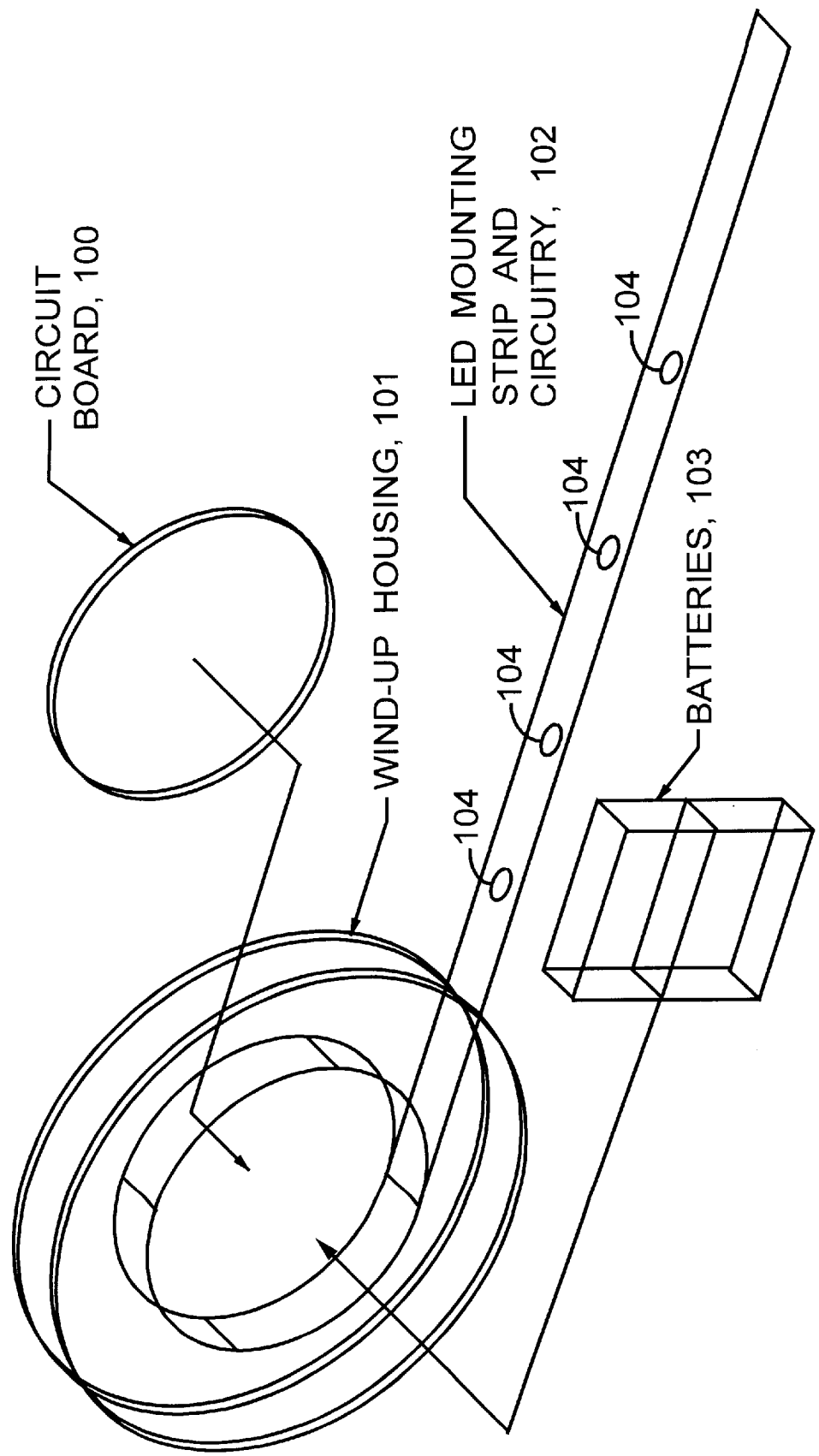
FIG. 1 is an illustration of the preferred embodiment of the present invention.

The reader's attention is now directed towards FIG. 1, which illustrates an embodiment of the present invention that uses: a circuit board 100, a reel and wind-up housing 101, an IR light emitting diode strip 102 and batteries 103 to power portable IR light emitting diodes 104, as shown, the system is a ¾" strip with LEDs placed every meter on each side that is rolled up on a reel. To deploy the marker the strip is staked at one end and the strip is simply unrolled of the reel. The PIRM is self packing and, if packaged to do so, can automatically roll itself up. The PIRM can be operated either by a switch on the reel or remotely. The flashing pattern is completely programmable. The pattern can be used as a wind direction indicator. The speed it flashes can be used to indicate how hard the wind is blowing or how dangerous the landing zone is.

As mentioned above, the invention of FIG. 1 makes a new use of commercially-available elements, including those of the above-cited patents. The PIRM has many advantages over present devices. The first is visibility. It is highly visible at over three miles even in urban background lighting, because of its brightness and unique flashing patterns. It can convey more information through the patterns such as a friend or foe code, or wind direction. It is compact and easy to deploy. The unit is also self contained making it easy to retrieve. It can be controlled remotely by an encoded laser beam that can be mounted on a helicopter or an airplane, or hand held. It is reusable.

This beacon can be used on vehicles and airplanes for friend or foe identification. The beacon can remain off until it is lazed with an encoded beam to turn it on.

Suitable infrared radiating elements are commercially-available, and described in such texts as "Semiconductor Lasers and Heterojunction LED's" by Henry Kressel et al, the disclosure of which is incorporated herein by reference. The radiating elements can be IR LEDs or lasers.

TABLE I

Comparison of the Programmable Infrared Marker (PRIM) to Other Patented Devices

The table below illustrates only the most obvious of differences between the PIRM and the other devices suspected of duplicating PIRM's function.

| Device: | PIRM | Electroluminescent . . . Light System | Aircraft Landing Zone Marker |
| --- | --- | --- | --- |
| US Pat. No. : | (AF Inv #) AFB00231 | 4,590,471 | 4,768,136 |
| Characteristics: | | | |
| Radiation | Infrared (Invisible without night-vision goggles) | Visible | Visible |
| Source | Diodes | Electroluminescent Lights | Chemicals |
| Power | 9 Volt Battery | Battery | N/A |
| Control | Remote (via Laser) or Manually Programmed | Remote (via Wires Running to Controllers and Transmitters | N/A |
| Weight | ~2 Lbs, Fits into BDU Pocket | Heavy? Many lights, power supply, wires | Very Heavy (to resist high winds) |
| Capabilities | Programmable for flash, strobe, coded messages, time delay . . . Operator need not be present | Limited sequence of coded pulses from operator's manual signals | Sits there and glows |
| User | Any Individul, On Foot | Small Crew with Transportation | Very Big Person or Crew with Jeep |

As you can see, PIRM and the other devices have only their names and a small aspect of their functions in common. They all are used as landing zone beacons, but that is where the similarities end.

While existing technology is used, Table I presents a comparison of the present invention over the prior art.

Figure 2:
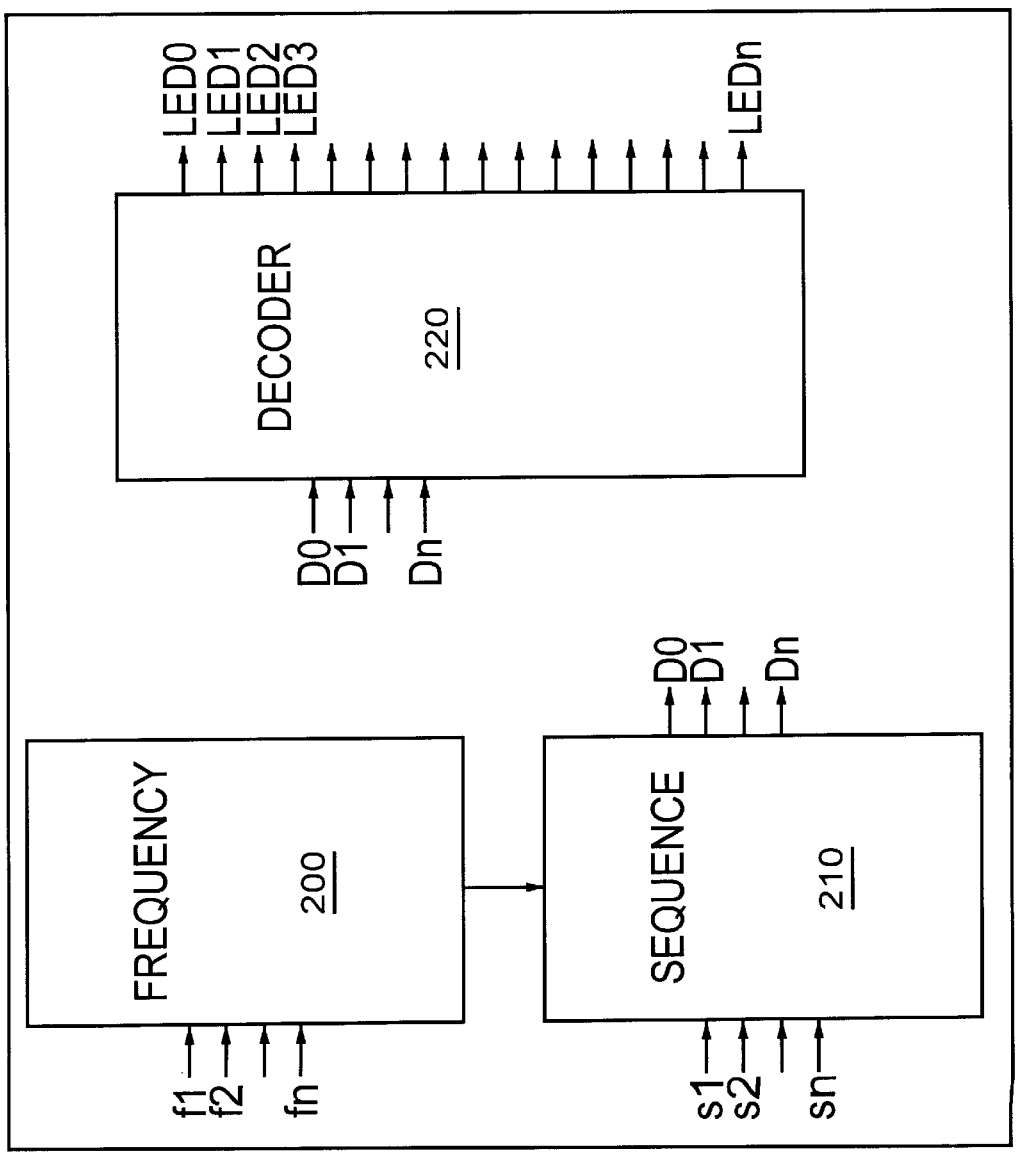
FIG. 2 is an illustration of the major circuit board elements of the system of FIG. 1.

FIG. 2 shows a block diagram of the electronics of the PIRM. The frequency block 200 consists of a clock circuit and dividers. This frequency circuit is fully programmable from 1 Mhz to 1 hz. The frequency will determine how fast the beacon goes through its sequence as programmed by the sequence element 210 through the decoder 220 which provides power to individual IR LEDs.

The technology of FIG. 2 can be replaced by existing equivalent systems such as the remotely controlled landing zone marker of Pieroway et al. What is important is that individually powered infrared light emitting diodes be individually provided with power to provide a pattern of IR illumination.

The PIRM consists of circuit board with all the control and support electronics on it, a reel, and printed wire strip that has LEDs mounted on it. The circuit board is circular to fit into the device compactly. On the side facing away from the reel it has a detector mounted approximately in the center. The side facing away from the reel has the control electronics and three switches. One of the switches will switch between the modes, one will turn on power and one will turn the unit off. The reel has a hollow center which contains the detector and the batteries. On the opposite side of the reel a fresnel lens is mounted to focus the light on the detector. The printed wire strip is 0.75" wide and 0.005" thick. There are 17 conductors on the strip. This makes it possible to have 15 addressable lines, one common line, and one return line. LEDs are placed approximately every meter on each side. Two LEDs are connected in series. The anode (+side) of the first one is connected to one address line and the cathode (-side) is connected to the common line. The second LED has its anode connected to the common line and its cathode connected to the return line. The common line is then isolated from the rest of the sets of LEDs. The strip comes rolled up on the reel, to deploy the strip the end of the strip is taped or staked down and the rest of the strip is rolled off the reel. The unit is packed manually by rolling up the strip using the finger holes on the side of the reel. For the automatic mode (which can be an alternative packaging design) a spring is used like in a tape measure and a button can be pushed and the unit can reel itself up.

Figure 4:
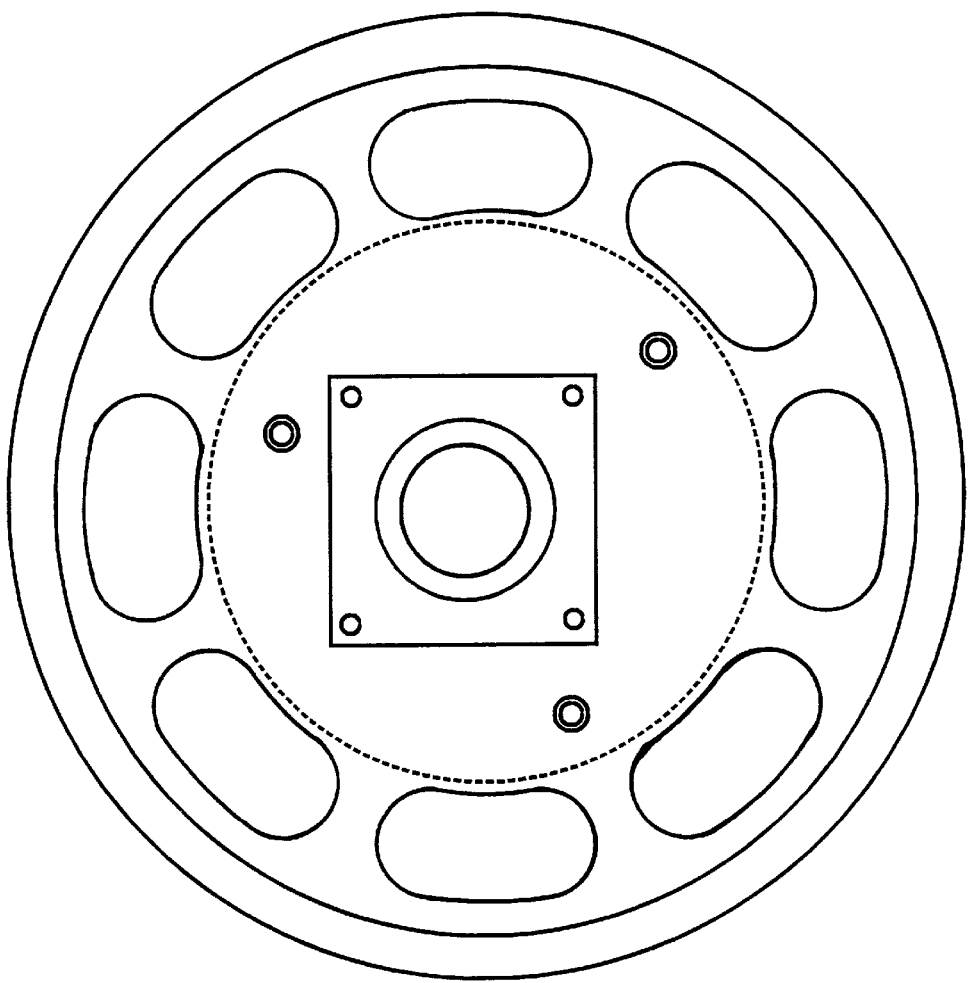
FIGS. 3 and 4 present two views of the reel and housing of FIG. 1.
Figure 3:
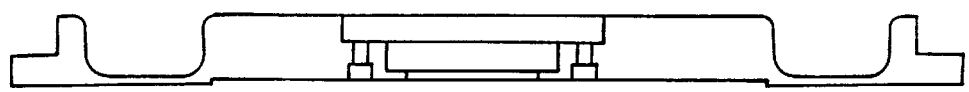

FIGS. 3 and 4 present two views of the aluminum rim that can be used in this invention, but other existing storing systems can be used.

In FIG. 2, the sequence block 210 determines the order the LEDs will be on. This can be programmed in the lab. The operator has a few choices of which to choose.

The decoder circuit 220 is a one of sixteen, but can be expanded to accommodate any number of LEDs.

Figure 5:
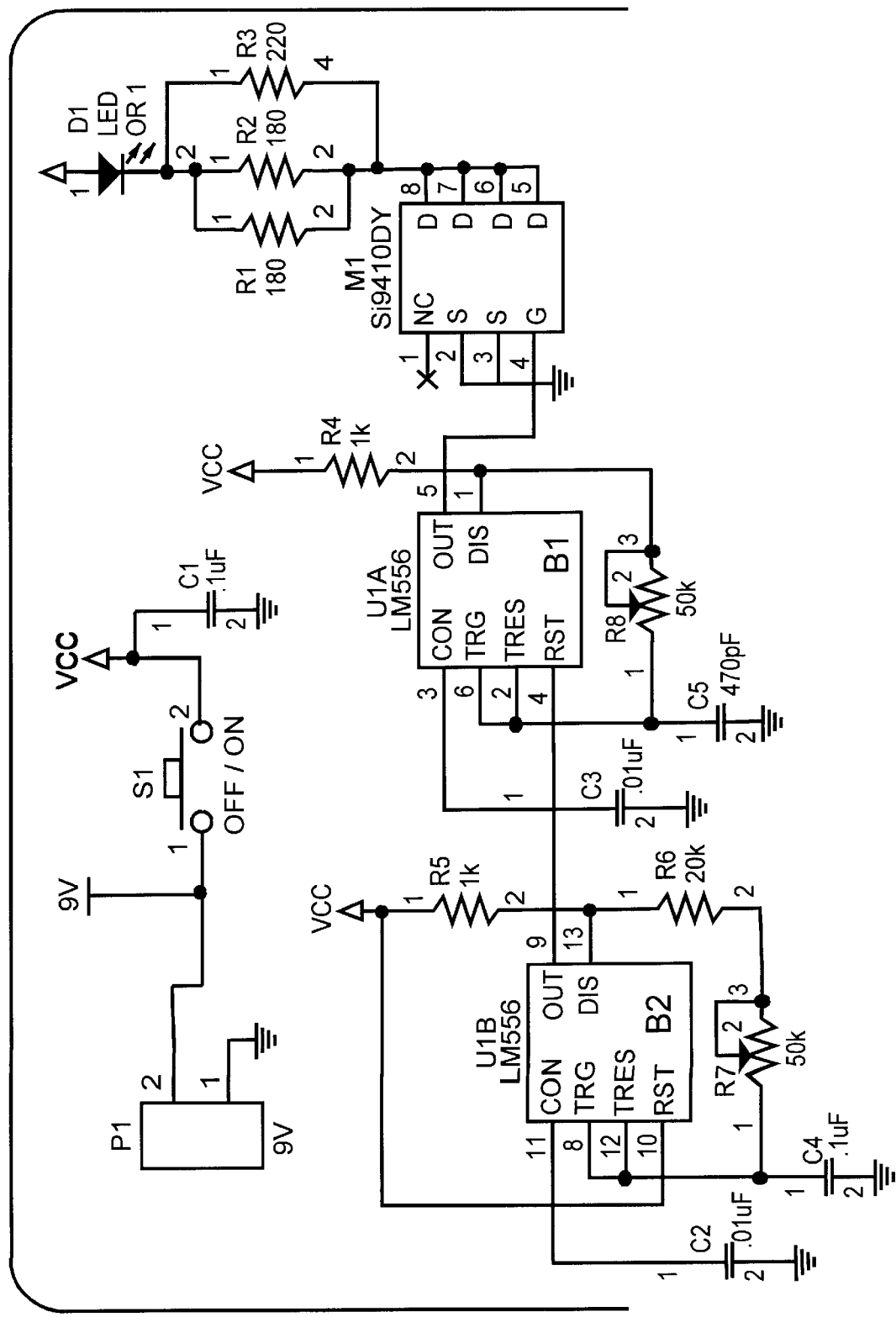
FIGS. 5 and 6 are electrical schematics of the circuit board of FIG. 1.
Figure 6:
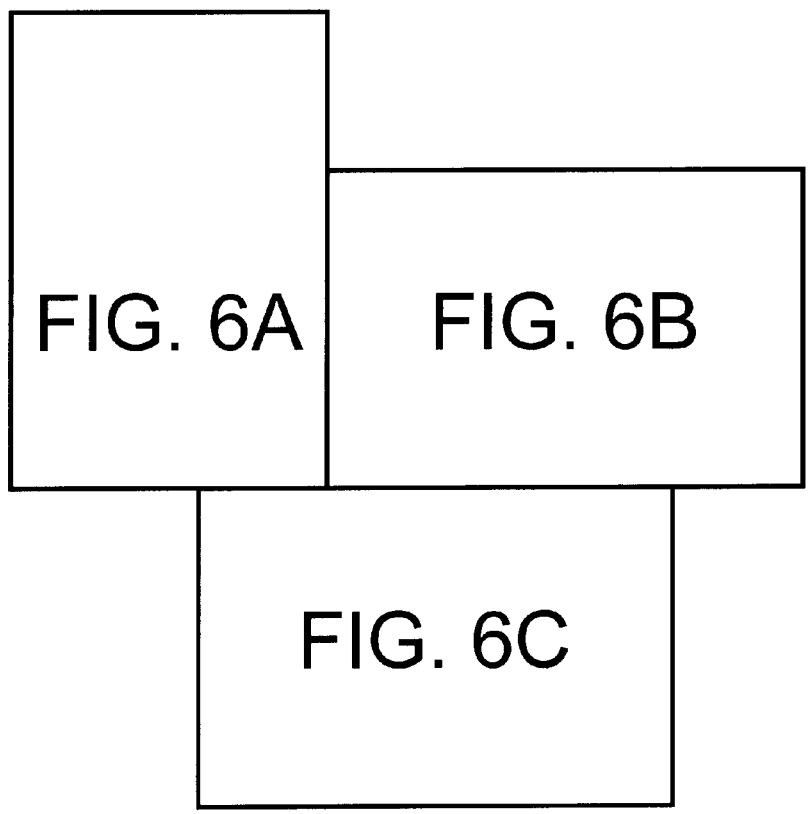
Figure 6A:
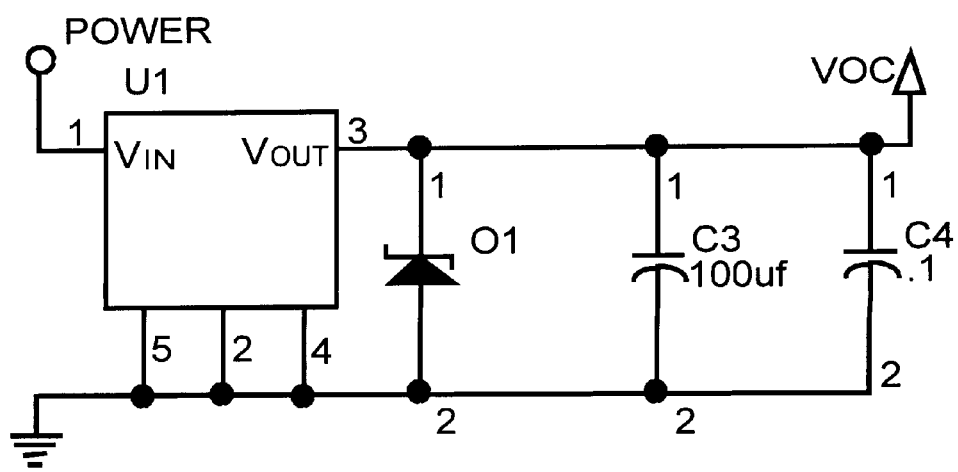
Figure 6B:
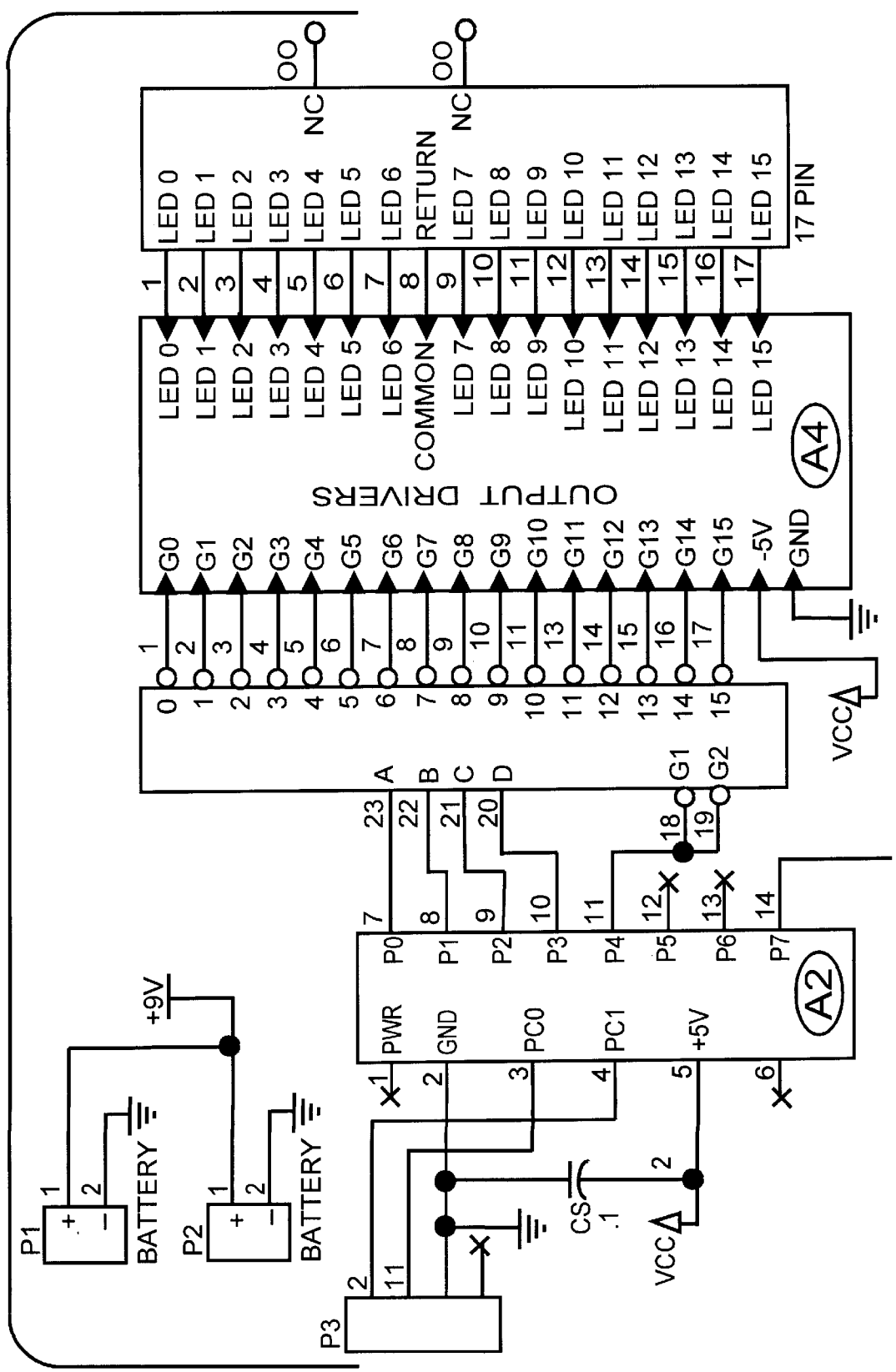
Figure 6C:
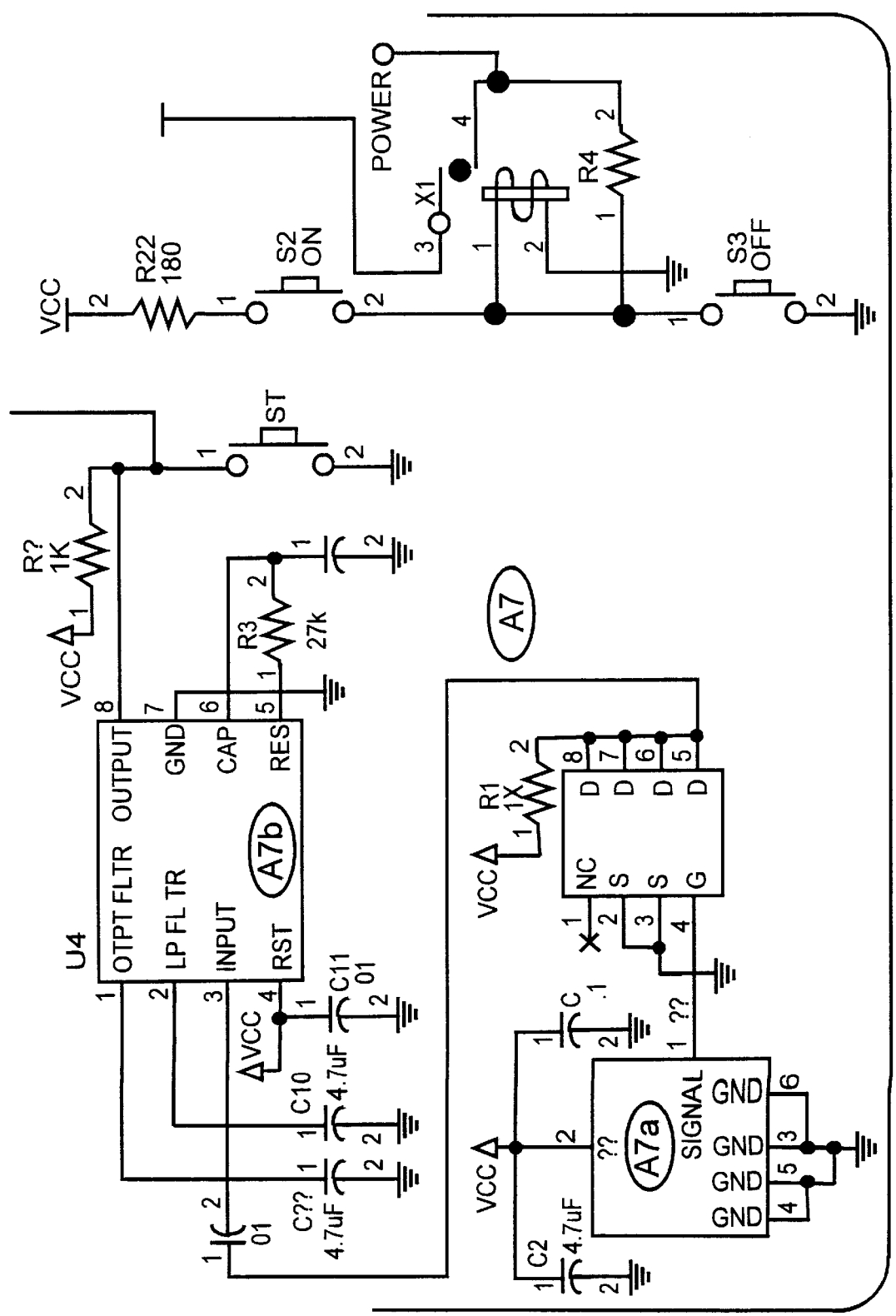

FIGS. 5 and 6 are electrical schematics of the circuit board of FIG. 1.

The PIRM electronics are powered by a high efficiency off the shelf power supply (A1). It converts from 9V to 5V with 83% efficiency. This will extend the operating time to be approximately twice that of a linear supply. It is powered by two 9V batteries wired in parallel.

The sequence and flash rate of the Opto Diode (OD 880) LEDs in the custom-made Parlex strip are controlled by a small microcontroller (UP1). The microcontroller contains an EEPROM that is accessible by a personal computer. It is programmed in BASIC via the four pin plug P3. The microcontroller can address any of the 15 LED lines/positions through a 4 to 16 decoder (U2). A bank of 15 mosfets (A4) are used to drive the LEDs.

Power is supplied to the PIRM by a latching relay (K1). When the on button is activated, the relay will latch so that power is applied to the circuit. When the off button is pushed it unlatches the relay so power will be removed from the circuit.

The PIRM can be programmed to operate in any number of modes. The LEDs can be slowly sequenced through from the beginning of the strip to the end to indicate direction. If sequence rate is fast enough it will look like they are on all the time. You can turn the sequencing on and off to make it look flashed. Codes can be programmed into the PIRM. A switch on the side of the enclosure (S1) allows the operator to toggle through the modes programmed into the microcontroller. An alternative to the button is a remote control circuit (A7). It allows the unit to be controlled by a modulated light beam. The beam has a carrier frequency of 40 kHz (B1) and can be modulated at a frequency in the range of 100 to 1000 Hz (B2) by the remote control unit (B). The detector and demod circuit (A7a) is an off the shelf circuit that will filter out any frequency other than 40 kHz and the demodulated light beam. The remaining signal will have a frequency component between 100 Hz to 1000 kHz and the tone decoder (U4) will detect and pull the input to the uP low causing it to change modes. Any number of these tone decoders can be strung together to give the PIRM more functionality. The range of the remote control is limited only by the power of the laser used. With a 40mW laser it has demonstrated with a range of a 100 meters.

The PRIM was designed as a portable, and quickly deployable landing zone marker for Special Operations personnel. It can be seen from a distance of at least three miles away. It incorporates a strobed mode that can be used to indicate wind direction or be encoded to convey other information about the landing zone. It can also be used similarly as an equipment and supply drop zone marker.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A portable aircraft landing illumination system comprising:

an electrical strip of infrared radiating element laser diodes used as radiating elements;

a battery which supplies electrical power;

a control circuit which receives electrical power from said battery and which supplies electrical power to individual infrared radiating element laser diodes and programs said diodes with an adjustable sequence and tuning so that the pattern and timing of said diodes indicates wind direction and speed; and a means for winding up and storing said electrical strip of radiating elements.

2. A portable aircraft landing illumination system, as defined in claim 1, wherein said winding means comprises a wheel which has an internal rim to which one end of said electrical strip is connected, and which rolls up around a central axis to wind up and store said electrical strip.

* * * * *